United States Patent
Kampe et al.

(10) Patent No.: US 6,691,244 B1
(45) Date of Patent: Feb. 10, 2004

(54) SYSTEM AND METHOD FOR COMPREHENSIVE AVAILABILITY MANAGEMENT IN A HIGH-AVAILABILITY COMPUTER SYSTEM

(75) Inventors: Mark A. Kampe, Los Angeles, CA (US); Andrew Hisgen, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/525,200

(22) Filed: Mar. 14, 2000

(51) Int. Cl.⁷ .................................................. G06F 11/00
(52) U.S. Cl. ........................................................ 714/4
(58) Field of Search .............................. 714/4, 43, 57; 709/223, 224

(56) References Cited

U.S. PATENT DOCUMENTS

| | | | |
|---|---|---|---|
| 5,390,326 A | 2/1995 | Shah | |
| 5,448,724 A | 9/1995 | Hayashi | |
| 5,655,081 A | 8/1997 | Bonnell et al. | |
| 5,661,668 A | 8/1997 | Yemini et al. | |
| 5,675,724 A | 10/1997 | Beal et al. | |
| 5,805,785 A | 9/1998 | Dias et al. | |
| 5,862,333 A | 1/1999 | Graf | |
| 5,961,650 A | * 10/1999 | Arendt et al. | ................... 714/2 |
| 6,088,727 A | 7/2000 | Hosokawa et al. | |
| 6,336,139 B1 | * 1/2002 | Feridun et al. | ............. 709/224 |
| 6,442,713 B1 | * 8/2002 | Block et al. | ................... 714/43 |
| 6,460,070 B1 | * 10/2002 | Turek et al. | ................ 709/202 |

FOREIGN PATENT DOCUMENTS

| | | |
|---|---|---|
| EP | 0 750 256 | 12/1996 |
| WO | WO 92 05485 | 4/1992 |
| WO | WO 97 29570 | 8/1997 |
| WO | WO 98 26541 | 6/1998 |
| WO | WO 99 17201 | 4/1999 |
| WO | WO 99 21098 | 4/1999 |

OTHER PUBLICATIONS

Sun Microsystems, Inc., "Solstice HA 1.3 Programmer's Guide," Apr. 1997.

Patent Abstracts of Japan, vol. 1998, No. 12, Oct. 31, 1998 and JP 10 187638 A Mitsubishi Electric Corp. Jul. 21, 1998, Abstract.

* cited by examiner

*Primary Examiner*—Scott Baderman
(74) *Attorney, Agent, or Firm*—William J. Kubida; Kent A. Lembke; Hogan & Hartson LLP (57) ABSTRACT

A system and method for availability management coordinates operational states of components to implement a desired redundancy model within a high-availability computing system. Within the availability management system, an availability manager monitors various reports on the status of components and nodes within the system. The availability manager uses these reports to direct components to change states if necessary, in order to maintain the desired system redundancy model. The availability management system includes a health monitor for performing component status audits upon individual components and reporting component status changes. The system also includes a watch-dog timer, which monitors the health monitor and reboots the entire node containing the health monitor if it becomes non-responsive. Each node within the system also includes a cluster membership monitor, which monitors nodes becoming non-responsive and reports node non-responsive errors.

36 Claims, 10 Drawing Sheets

SYSTEM AND METHOD FOR COMPREHENSIVE AVAILABILITY MANAGEMENT IN A HIGH-AVAILABILITY COMPUTER SYSTEM

BACKGROUND

1. Technical Field

This invention relates generally to a system for availability management within a computer system, and more particularly, to a system for resource availability management among distributed components that jointly constitute a highly available computer system.

2. Background of the Invention

Computers are becoming increasingly vital to servicing the needs of business. As computer systems and networks become more important to servicing immediate needs, the availability of such systems becomes paramount. System availability is a measure of how often a system is capable of providing service to its users. System availability is expressed as a percentage representing the ratio of the time in which the system provides acceptable service to the total time in which the system is required to be operational. Typical high-availability systems provide up to 99.999 percent (five-nines) availability, or approximately five minutes of unscheduled downtime per year. Certain high-availability systems may exceed five-nines availability.

In order to achieve high availability, a computer system provides means for redundancy among different elements of the system. Clustering is a method for providing increased availability. Clusters are characterized by multiple systems, or "nodes," that work together as a single entity to cooperatively provide applications, system resources, and data to users. Computing resources are distributed throughout the cluster. Should one node fail, the workload of the failed node can be spread across the remaining cluster members. An example of a clustered computer system is the Sun™ Cluster product, manufactured by Sun Microsystems, Inc.

Redundant computing clusters can be configured in a wide range of redundancy models: 2n redundant where each active component has its own spare, n+1 redundant where a group of active components share a single spare, and load sharing where a group of active components with a surplus capacity share the work of a failed component. There is also a wide range of reasonable policies for when components should and should not be taken out of service. In a distributed computing environment, resources such as CPU nodes, file systems, and a variety of other hardware and software components are shared to provide a cooperative computing environment. Information and tasks are shared among the various system components. Operating jointly, the combination of hardware and software components provides a service whose availability is much greater than the availability of any individual component.

Error detection in such a distributed computing environment becomes more complex and problematic. Distributed components may not ever agree on where exactly an error has originated. For example, if a link between components A and B stops sending information between components A and B, component A may not be sure if the failure originated in the link, or in component B. Similarly, component B may not be sure if the failure originated in the link, or in component A. Some errors may not be detectable within the failing component itself, but rather have to be inferred from multiple individual incidents, perhaps spanning multiple components. Additionally, some errors are not manifested as component failures, but rather as an absence of response from a component.

Within the overall computer system, external audits of individual components may, themselves, fail or fail to complete. The systems that run the error checking and component audits may fail, taking with them all of the mechanisms that could have detected the error.

Thus, there is a need for a system that manages availability within a highly-available distributed computing system. Such a system would manage the availability of individual components in accordance with the needs of the overall system. The system would initiate and process reports on the status of components, and readjust work assignments accordingly.

SUMMARY OF THE INVENTION

The present invention manages the availability of components within a highly-available distributed computing system. An availability management system coordinates operational states of components to implement a desired redundancy model within the computing system. Components within the system are able to directly participate in availability management activities, such as exchanging checkpoints with backup components, health monitoring, and changing operational states. However, the availability management system does not require individual components to understand the redundancy model and fail-over policies, for example, who is backup for whom, and when a switch should take place.

In one embodiment of the present invention, a high-availability computer system includes a plurality of nodes. Each node includes a plurality of components, which represent hardware or software entities within the computer system. An availability management system manages the operational states of the nodes and components.

Within the availability management system, an availability manager receives various reports on the status of components and nodes within the system. The availability manager uses these reports to direct components to change state, if necessary, in order to maintain the required level of service. Individual components may report their status changes, such as a failure or a loss of capacity, to the availability manager via in-line error reporting. In addition, the availability management system contains a number of other elements designed to detect component status changes and forward them to the availability manager.

The availability management system includes a health monitor for performing component status audits upon individual components and reporting component status changes to the availability manager. Components register self-audit functions and a desired auditing frequency with the health monitor. The system may also include a watch-dog timer, which monitors the health monitor and reboots the entire node containing the health monitor if it becomes non-responsive. Each node within the system may also include a cluster membership monitor, which monitors nodes becoming non-responsive and reports node non-responsive errors to the availability manager.

The availability management system also includes a multi-component error correlator (MCEC), which uses pre-specified rules to correlate multiple specific and non-specific errors and infer a particular component problem. The MCEC receives copies of all error reports. The MCEC looks for a pattern match between the received reports and known failure signatures of various types of problems. If a pattern match is found, the MCEC reports the inferred component problem to the availability manager.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

DETAILED DESCRIPTION OF PREFERRED EMBODIMENTS

Figure 1:
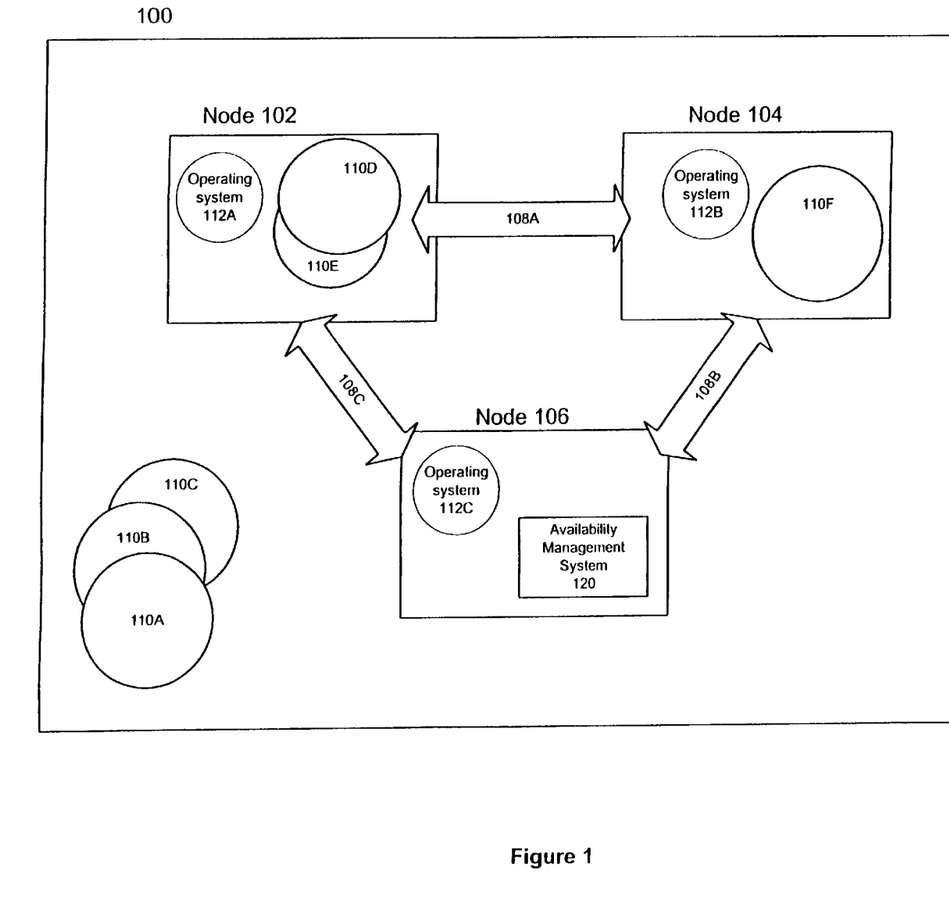
FIG. 1 is an overview of a cluster within a computer system including an availability management system in accordance with an embodiment of the present invention.

FIG. 1 shows an overview of a cluster arrangement within a computer system. A cluster 100 contains three nodes 102, 104 and 106. Each node is a processing location within the computer system. Nodes 102, 104 and 106 are connected to each other by a set of multiple redundant links 108. Multiple redundant link 108A connects nodes 102 and 104. Multiple redundant link 108B connects nodes 104 and 106. Multiple redundant link 108C connects nodes 106 and 102.

Cluster 100 also contains a group of components 110 (110A, 110B, 110C, 110D, 110E and 110F) representing hardware and software entities within the cluster 100. Components 110A, 110B, and 110C are located outside of the nodes of the cluster 100. However, components 110D and 110E are located in node 102, and component 110F is located in node 104. The availability of components 110 and nodes 102, 104 and 106 is managed by an availability management system 120 located in node 106. Availability management system 120 additionally manages the overall health of the cluster 100. It will be understood by one of skill in the art that cluster 100 may contain more or fewer nodes and more or fewer components.

In one embodiment, each node 102, 104 and 106 contains a copy of the operating system 112 used within the cluster 100. A copy of the operating system 112 is stored in executable memory, and may be rebooted from disk storage (not shown) or from a computer network connected to the cluster 100. The operating system 112 may also be stored in nonvolatile random access memory (NVRAM) or flash memory. Individual nodes 102, 104 and 106 can each be rebooted with no effect on the other nodes.

Nodes 102, 104 and 106 cooperate jointly to provide high-availability service. Each node 102, 104 and 106, all of which are members of the cluster 100, is referred to as a "peer" node. If one of the peer nodes fails or has to be serviced, another peer node will assume his work, and the cluster 100 will continue to provide service. It is the role of the availability management system 120 to detect failures within the system and orchestrate failure recovery. Applications running on peer nodes interact through a location-independent distributed processing environment (DPE) so that work can be easily migrated from a failing node to another healthy peer node. The multiple redundant links 108 ensure that a failure by a single interconnect cannot isolate a node from its peers. For example, if a single interconnect within link 108A fails between nodes 102 and 104, there are other redundant interconnects within link 108A to continue service between nodes 102 and 104.

The set of components 110 within cluster 100 are individual hardware or software entities that are managed within the cluster to jointly provide services. The availability of such jointly managed components 110A–F is greater than the availability of any single component. The availability management system 120 assigns available selected components to act as stand-bys for active components, and introduces the active and stand-by components to each other. For example, availability management system 120 could assign components 110D, 110E, and 110F to serve as stand-bys for active components 110A, 110B, and 110C. Components are introduced to one another by an exchange of messages with the availability management system 120.

Figure 2:
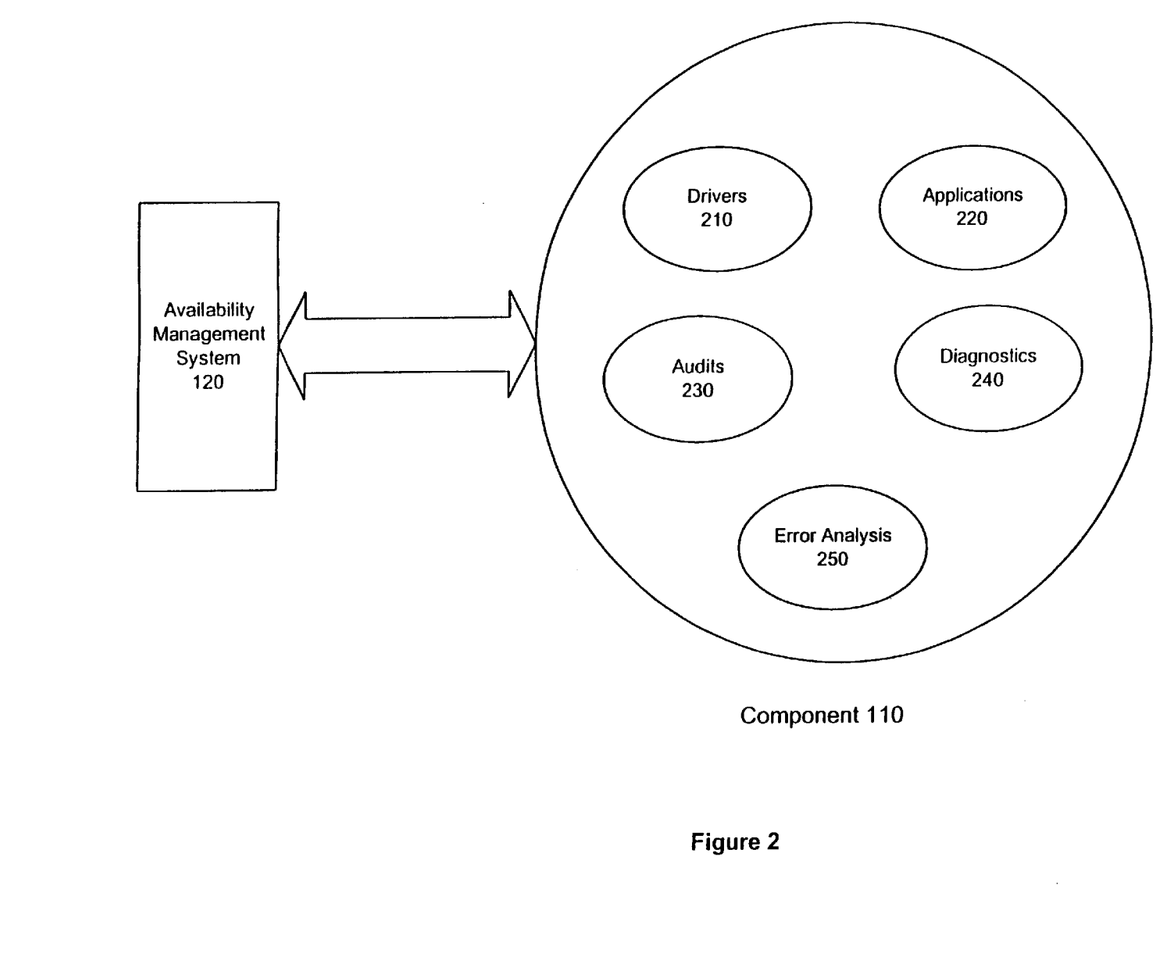
FIG. 2 is a block diagram of an individual component operating within a high availability computer system architecture in accordance with an embodiment of the present invention.

FIG. 2 is a block diagram of an individual component operating within a high-availability computer system architecture in an embodiment of the present invention. Component 110 interacts with an availability management system 120. Component 110 contains physical device drivers 210 and applications 220. The drivers 210 and applications 220 comprise the functionality for which component 110 is designed. As will be evident to one of skill in the art, component 210 may contain a wide variety of different drivers 210 and applications 220.

Availability management system 120 has limited visibility into the inner workings of component 110. Component 110 therefore assumes significant responsibility for its own management. For example, component 110 includes several features for internal fault detection. Component 110 has an auditing function 230 for detecting its own faults and reporting them to the availability management system 120. Component 110 also includes a diagnostics function 240 for determining whether component 110 itself is currently suitable for service. Component 110 further includes an error analysis function 250 for detecting, containing, and if possible repairing internal failures.

High-availability computer systems may be implemented using a variety of different component redundancy schemes.

The availability management system 120 of the present invention is capable of supporting several different redundancy models. Different redundancy models may be used for different products utilizing the same availability management system 120. Individual components need not understand the redundancy model or the sensing and management networks and policies that control their use. The availability management system 120 directs components to change states, at the appropriate times, to implement the desired redundancy model. This enables a single component implementation to be used in a wide range of products.

Figure 3:
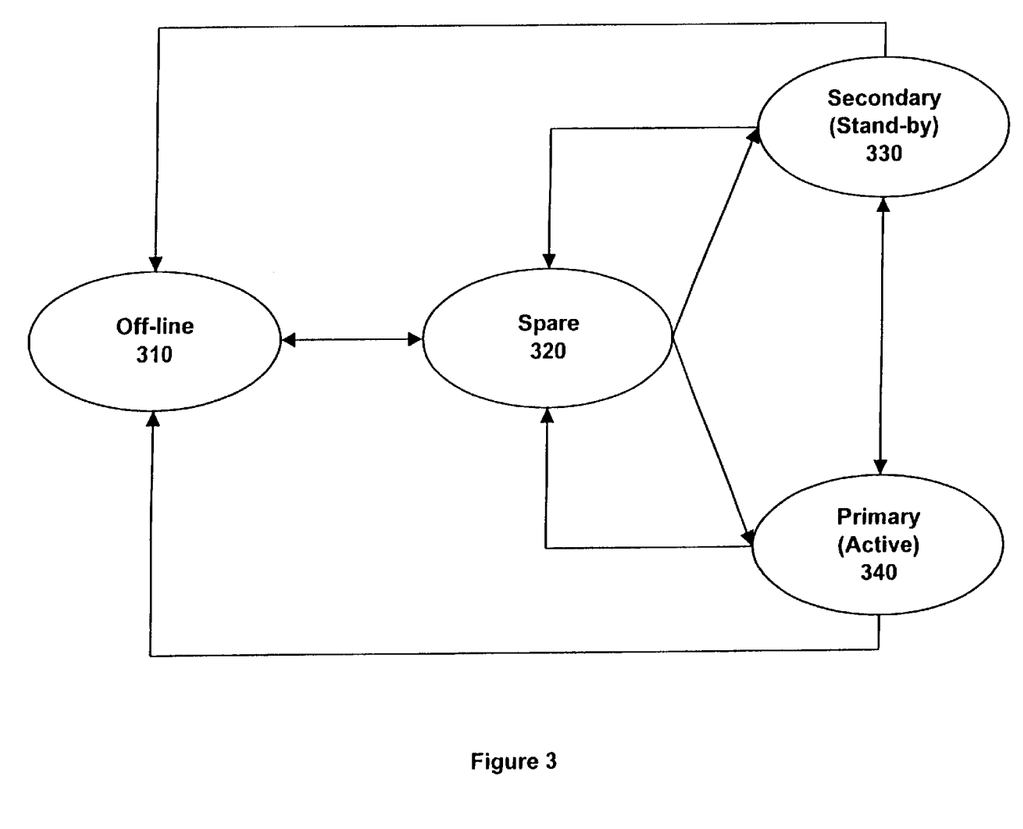
FIG. 3 is a diagram of the states that a component may take within a high availability computer system architecture in accordance with an embodiment of the present invention.

FIG. 3 is a diagram of the states that a component can take within a high-availability computer system architecture in an embodiment of the present invention. A component may take one of four different states: off-line 310, spare 320, secondary (stand-by) 330, or primary (active) 340. An off-line 310 component can run diagnostics or respond to external management commands, but is not available to perform services. A spare 320 component is not currently performing any services but is available to do so at any time. A secondary 330 component may not actually be carrying system traffic, but it is acting as a stand-by for a primary 340 component, and the secondary 330 component is prepared to assume an active role at any time. A primary 340 component is active and providing service in the system. If a secondary 330 component has been assigned to it, the primary 340 component is also sending regular checkpoints to its secondary 330. The checkpoint messages keep the secondary 330 informed of the current status of the primary 340.

Figure 4A:
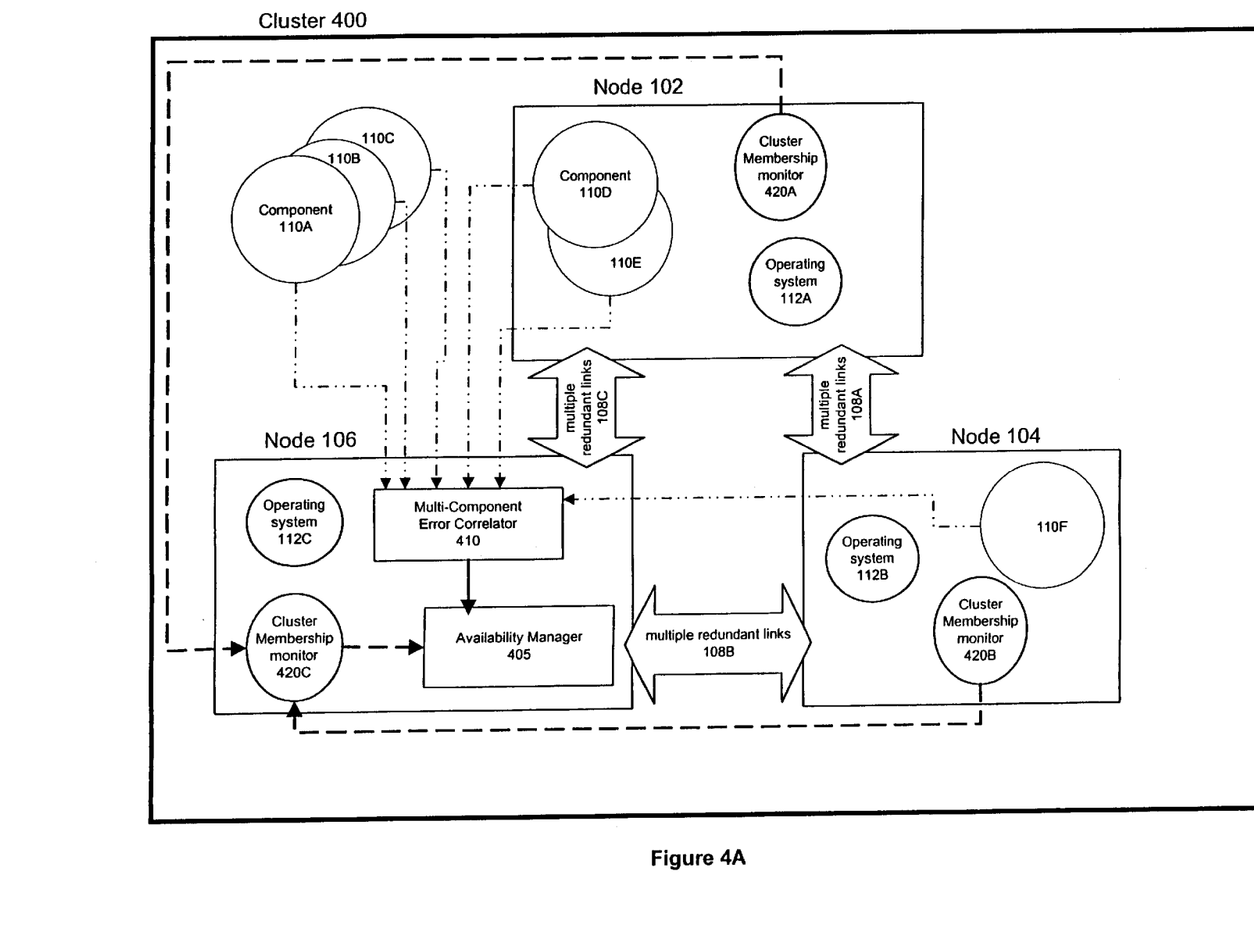
FIG. 4A is a block diagram of a cluster within a computer system including an availability management system in accordance with an embodiment of the present invention.

FIG. 4A is a block diagram of a cluster within a computer system including an availability management system. FIG. 4A shows an embodiment wherein a centralized availability management system is structured within the distributed computing environment of a cluster 400. Information relating to component availability is centralized in a single availability manager 405. This allows availability decisions to be made in a global fashion, taking into account information from the entire cluster.

Cluster 400 contains three peer nodes 102, 104 and 106. Each node is interconnected with its peer nodes by a set of multiple redundant links 108. Each node includes a copy of the operating system 112. The cluster 400 also includes a set of components 110. Availability manager 405 located in node 106 receives inputs from various parts of the cluster and manages the availability of the nodes 102, 104 and 106 and the set of components 110. Availability manager 405 could alternately be located in node 102 or node 104, if, for instance, the master node 106 failed.

Each node 102, 104 and 106 contains a cluster membership monitor 420A, 420B and 420C, respectively. Each cluster membership monitor 420 maintains contact with all other cluster nodes, and elects one of the nodes to be the "cluster master." The cluster master detects new nodes and admits them to the cluster, and uses heartbeats to detect failures of existing members of the cluster. A heartbeat is a short message exchanged regularly to confirm that the sender is still functioning properly. The cluster master also acts as a central coordination point for cluster-wide synchronization operations. In cluster 400, node 106 is the cluster master. Cluster membership monitor 420A provides a heartbeat for node 102 to cluster membership monitor 420C. Cluster membership monitor 420B provides a heartbeat for node 104 to cluster membership monitor 420C. The availability manager 405 typically runs on the cluster master node, to avoid numerous race conditions and distributed computing issues.

When a node becomes non-responsive, the cluster membership monitor responsible for monitoring that node reports this error to the availability manager 405. For example, if node 104 becomes non-responsive, cluster membership monitor 420C will no longer receive a heartbeat for node 104 from cluster membership monitor 420B. Cluster membership monitor 420C would report this error to the availability manager 405. In an alternative embodiment of the availability management system with only a single node, a cluster membership monitor is not required.

Cluster 400 also contains a multi-component error correlator (MCEC) 410 located in node 106. Components 110 report component status changes to the MCEC 410. The MCEC 410 receives both specific and non-specific event reports and attempts to infer the system failure that has caused these events. For example, there are situations where an error cannot reasonably be immediately isolated to a particular component, because the symptoms seen by any one component are inconclusive. Only correlating reports from multiple components can identify the real problem. In the embodiment shown in FIG. 4A, the MCEC 410 is located on the cluster master node 106. However, in another embodiment the MCEC 410 may be located on a different node. The MCEC 410 uses pre-configured rules to decide whether or not a sequence of events matches a known pattern, corresponding to a known error. When a match is found, the MCEC 410 reports the error to the availability manager 405 as a component error report. Examples of component error reports include a component failure and a component loss of capacity. The MCEC 410 may also perform filtering actions upon the event reports received.

Figure 4B:
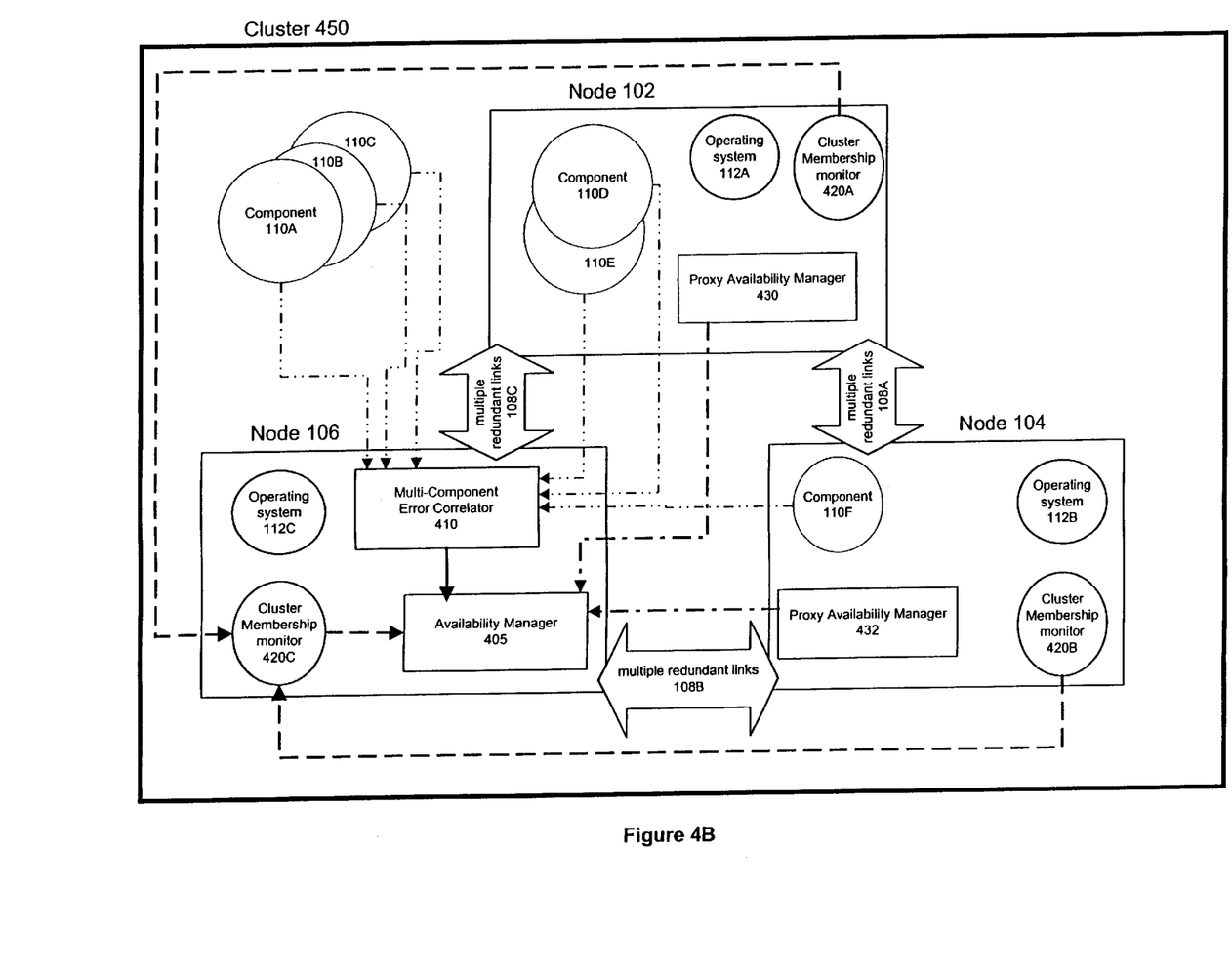
FIG. 4B is a block diagram of a cluster within a computer system including an availability management system in accordance with another embodiment of the present invention.

FIG. 4B shows another embodiment of a cluster within a computer system including an availability management system. A cluster 450 contains three peer nodes: 102, 104 and 106. Each node is interconnected with its peer nodes by a set of multiple redundant links 108. Each node contains a copy of the operating system 112. The cluster 450 also includes a set of components 110.

An availability manager 405 located in node 106 receives inputs from various parts of the cluster and manages the availability of the nodes 102, 104 and 106 and the components 110. All component status change reports from the set of components 110 are sent directly to a MCEC 410 located on node 106. In these respects cluster 450 is the same as cluster 400.

However, in cluster 450, node 102 contains a proxy availability manager 430, and node 104 contains a proxy availability manager 432. The proxy availability managers 430 and 432 act as relay functions to the availability manager 405, relaying local messages they receive to the availability manager 405. For example, proxy availability managers 430 and 432 relay component registrations, new component notifications, and component state change acknowledgements to the availability manager 405. Additionally, the availability manager 405 relays component state change commands through proxy availability managers 430 and 432 to local components. All availability decisions are still made by the availability manager 405. The proxy availability managers 430 and 432 merely allow applications to send messages locally.

The availability manager 405 is a highly available service. In one embodiment of an availability management system, there are stand-by availability managers running on other nodes. If the active availability manager fails, a designated stand-by will take over, with no affect on the components being managed.

The proxy availability managers as shown in cluster 450 may also be used in an embodiment of a fail-over policy for the master availability manager. In one embodiment, the master availability manager has a standby availability manager, so that if the master availability manager fails, a backup is available. Periodically, the master availability manager passes checkpoint messages to the standby availability manager, to keep the backup informed of the current state of the components managed by the master availability manager.

However, if the master availability manager fails, there is a possibility that some of the checkpointing information sent to the standby availability manager was incorrect. In another embodiment, this problem is solved by allowing the proxy availability managers to serve as local availability managers for the components on their local node. Each local availability manager would still function in the decision-making process only as a relay to the master availability. manager. However, each local availability manager would also keep track of local states and registrations. As discussed above, the proxy availability managers 430 and 432 relay component state change commands from the availability manager 405, and relay returned component state change acknowledgements back to the availability manager 405. Thus, the local proxy availability managers are kept informed of component states. Upon the failure of the master availability manager, the backup availability manager would query the local availability managers for local information. The local availability managers would assist the backup availability manager in recovering the information of the failed master availability manager.

Figure 5:
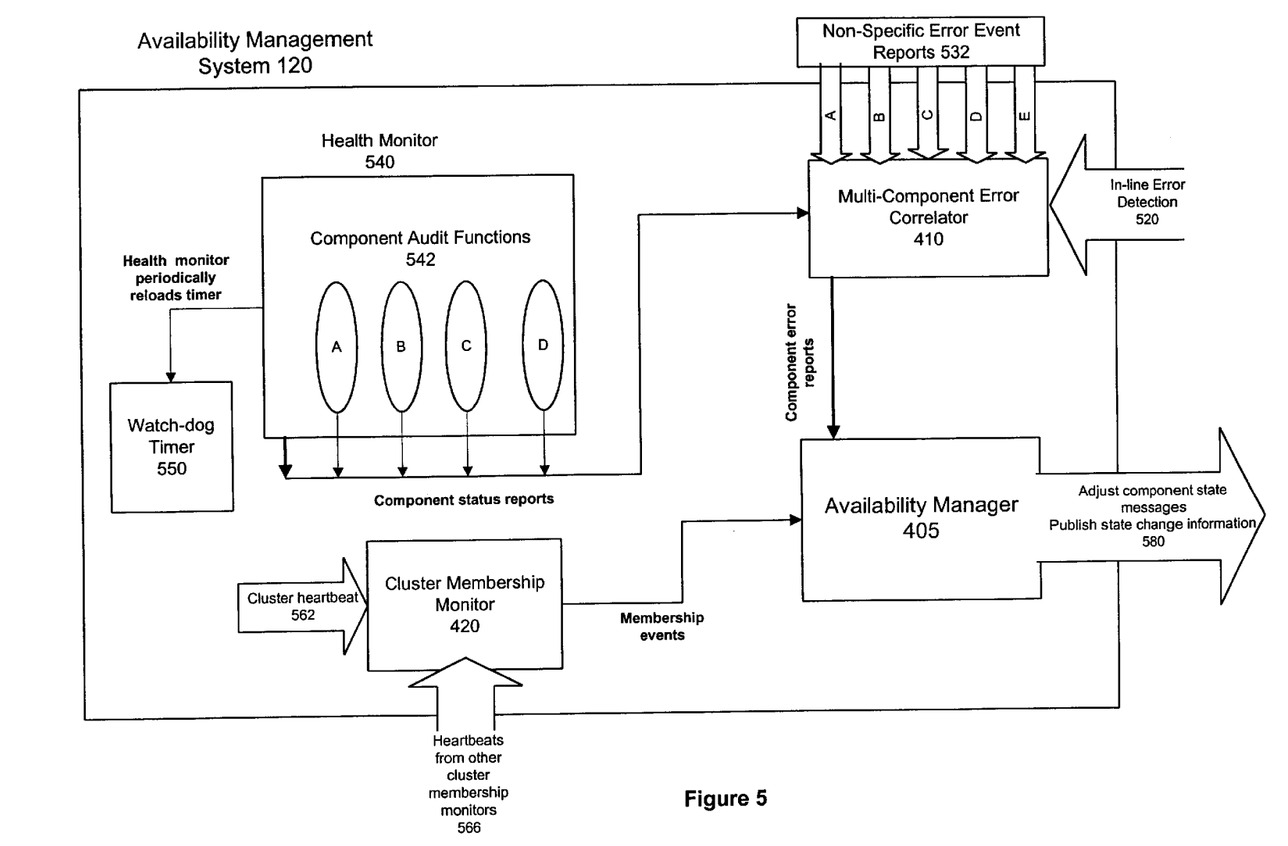
FIG. 5 is a block diagram of an availability management system in accordance with an embodiment of the present invention.

FIG. 5 is a block diagram of an availability management system in an embodiment of the present invention. An availability management system 120 includes: an availability manager 405, a multi-component error correlator (MCEC) 410, a health monitor 540, a watch-dog timer 550, and a cluster membership monitor 420. The availability management system 120 assigns components to active and stand-by roles according to a wide range of possible redundancy models, without requiring the components to understand the overall system configuration. The availability management system 120 also assists components in the monitoring of their own health, without constraining how individual components ascertain their own health. The availability management system 120 further gathers information about component health from a variety of direct and indirect sources, and facilitates the exchange of checkpoints between active and stand-by components. The functionality of the availability management system as described herein is preferably implemented as software executed by one or more processors, but could also be implemented as hardware or as a mixture of hardware and software.

Error messages and other types of events are reported through different inputs into the components of the availability management system 120. Event and error reports are consolidated for final decision-making in the availability manager 405. The MCEC 410 and the cluster membership monitor 420 report to the availability manager 405. The availability manager 405 outputs 580 component state messages and state change information to accomplish the management tasks of the availability management system 120.

The operation of the individual components within the availability management system 120 shown in FIG. 5 will now be discussed in further detail. Where applicable, reference will be made to additional figures providing more detail on the operation of individual components within the availability management system 120.

The MCEC 410 receives both specific and non-specific error event reports and component status change reports.

The MCEC 410 uses pre-configured rules to search for known patterns in the reported events. When a reported event sequence matches a known pattern, the MCEC 410 is able to infer a particular error, such as a component failure or a component becoming non-responsive. The MCEC 410 then reports the error as a component error report to the availability manager 405.

Individual components report specific errors to the MCEC 410 in multiple ways. Non-specific error event reports 532, which may not have a known correlation to any specific component, are sent to the MCEC 410. In-line error detection 520 takes place while a component is performing tasks. During the performance of a task, an error is detected by the component and the MCEC 410 is notified of the particular component status change by the component directly. Additionally, a component may perform periodic self-audits 542, which are performed at specified intervals whether the component is performing a task or is currently idle. Errors detected during component audits 542 are reported to the MCEC 410 as component status change reports. A health monitor 540 aids in the performance of component-specific audit functions.

In one embodiment, all error reports from all components (both specific and non-specific) are sent to the MCEC 410. This provides a centralized decision making location. However, in another embodiment, multiple MCECs may be used in a network of error correlators. In a multiple MCEC system, different MCECs receive error reports by subscribing to a certain set of event reports distributed via a publish/subscribe event system. A publish/subscribe event system automatically distributes event notifications from an event publisher to all processes (on all nodes) that have subscribed to that event. The publish/subscribe event system permits interested processes to obtain information about service relevant occurrences like errors, new devices coming on-line, and service fail-overs. The use of multiple MCECs allows flexibility in the availability management system 120. For example, an additional MCEC may be added more easily to deal with certain problems without changing the existing MCEC structure. Multiple MCECs may all be located on a single common node, or they may be located on different nodes.

The MCEC 410 is a rule-based event filter. In one embodiment, the rules may be implemented in compiled code within the MCEC 410, or in another embodiment may be expressed in a rule language that is interpreted by the MCEC 410. The MCEC 410 filters out stale, redundant, and misleading event reports to avoid unnecessary or ineffective error messages being sent to the availability manager 405. For example, if ten different components all report the same event to the MCEC 410, only one error message needs to be passed along to the availability manager 405. In another example, the MCEC 410 can also perform temporal correlations on event messages to determine that a particular error message to the availability manager 405 is not having the desired effect. If the MCEC 410 discovers that the same component has failed a successive number of times, the MCEC 410 may report an entire node failure to the availability manager 405, to cause a rebooting of the entire node instead of another (probably fruitless) rebooting of the failed component. It will be understood by one of skill in the art that many different sets of rules may be implemented in the MCEC 410.

Figure 6:
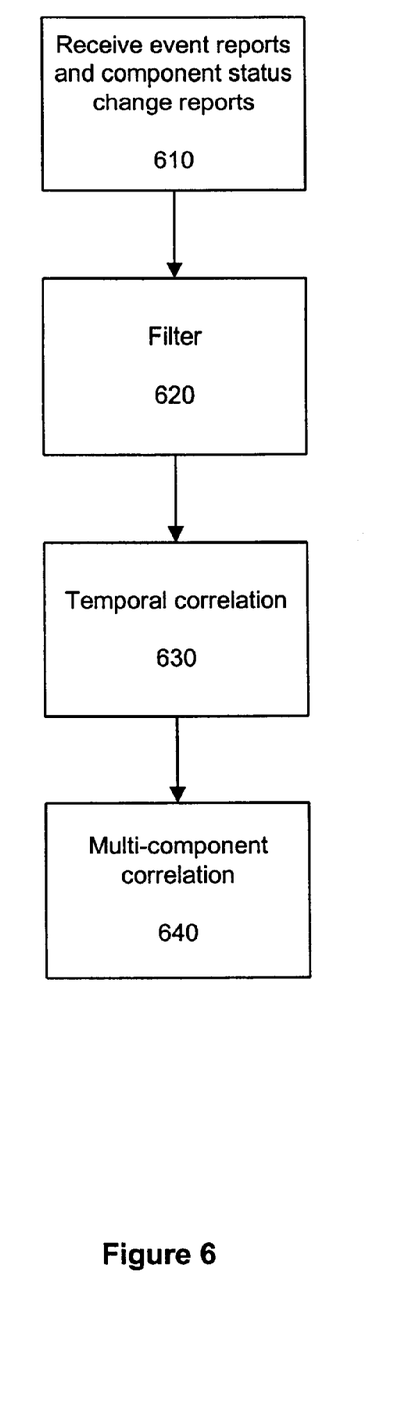
FIG. 6 is a flowchart of the functions of a multi-component error correlator module within an availability management system in accordance with an embodiment of the present invention.

The functions of the MCEC 410 are shown in more detail in FIG. 6. FIG. 6 is a flowchart of one embodiment of the functions of a MCEC 410. In step 610, the MCEC 410 receives error event reports and component status change reports. A typical report contains information such as: the affected component and sub-element, the severity of the incident, the nature of the incident, the time of the incident, and a unique incident tag. It will be understood by one of skill in the art that many other types of information may be provided during reporting to the MCEC.

In step 620, filtering is performed on the received reports. Filtering allows the MCEC 410 to screen out certain reports before they are passed onto the availability manager 405. For example, the MCEC 410 may filter reports by recording the highest severity level currently received on an incident tag, and suppressing all reports on the same tag with lower than the recorded severity. The MCEC 410 may also suppress all reports lower than a specified severity level, or suppress all reports corresponding to a particular component. The MCEC 410 may also suppress subsequent reports on a single component that occur within a specified time period and are of the same or lower severity.

In step 630, the MCEC 410 performs temporal correlations on the received reports. For example, the MCEC 410 may accumulate reports below a specified severity, and forward the reports to the availability manager 405 only if the number of reports received within a specified time period exceeds a specified threshold. In step 640, the MCEC 410 performs multi-component correlation on the received reports. If a specified combination of incoming reports are received within a specified time interval, the MCEC 410 generates a particular error report.

It will be understood by one of skill in the art that the examples provided herein are merely illustrative. The MCEC 410 is capable of performing many different types of error filtering and error correlation on different types of error event reports and component status change reports.

Referring back to FIG. 5, the health monitor 540 allows individual components to register component audit functions 542 with the health monitor 540. For each component audit function 542, a component will register a specific audit function to be performed, an exception handler, a polling interval frequency for the audit, and a nominal completion time for the audit. An exception handler is called by a component if an "exception" (a branching condition usually indicating an error condition) is detected during the performance of an audit function. The health monitor 540 ensures that the component audit functions 542 are performed with the registered polling frequency. For each audit 542, the health monitor 540 sends a message to the component to be audited, directing it to initiate the registered audit routine. If an error is detected during the performance of a component audit, the registered exception handler will relay a component status change message to the MCEC 410. If the component audit function fails to complete within the registered nominal completion time, the health monitor 540 will automatically report a component status change message reporting failure of the associated component to the MCEC 410.

The watch-dog timer 550 monitors the health monitor 540. Certain errors may cause the health monitor 540 to become non-responsive, such as errors within the health monitor 540, or problems in the underlying operating system. If the health monitor 540 ever becomes non-responsive, the watch-dog timer 550 will automatically reboot the entire node containing the health monitor 540. The rebooting of the entire node will cause the entire node and all associated components to become non-responsive. When the node restarts and the components restart, a new health monitor will monitor them.

The cluster membership monitor 420 detects cluster heartbeats 562 and 566. The loss of a heartbeat is reported to the availability manager 405 as a "membership event." Membership events may include the loss of a node heartbeat, a new node joining the cluster, or a node resigning from the cluster. The availability manager 405 takes the loss of a node heartbeat as indicating that all components running on that node have failed. The availability manager 405 then reassigns work within the cluster to distribute the load from the failed node's components.

If an entire node or the health monitor 540 becomes non-responsive for any reason, the watch-dog timer 550 reboots the entire node. Once a node is rebooted, its cluster membership monitor stops exchanging heartbeats. The lack of a heartbeat will be detected by the cluster membership monitor on the master node. This event will be reported to the availability manager 405 as a membership event.

Figure 7:
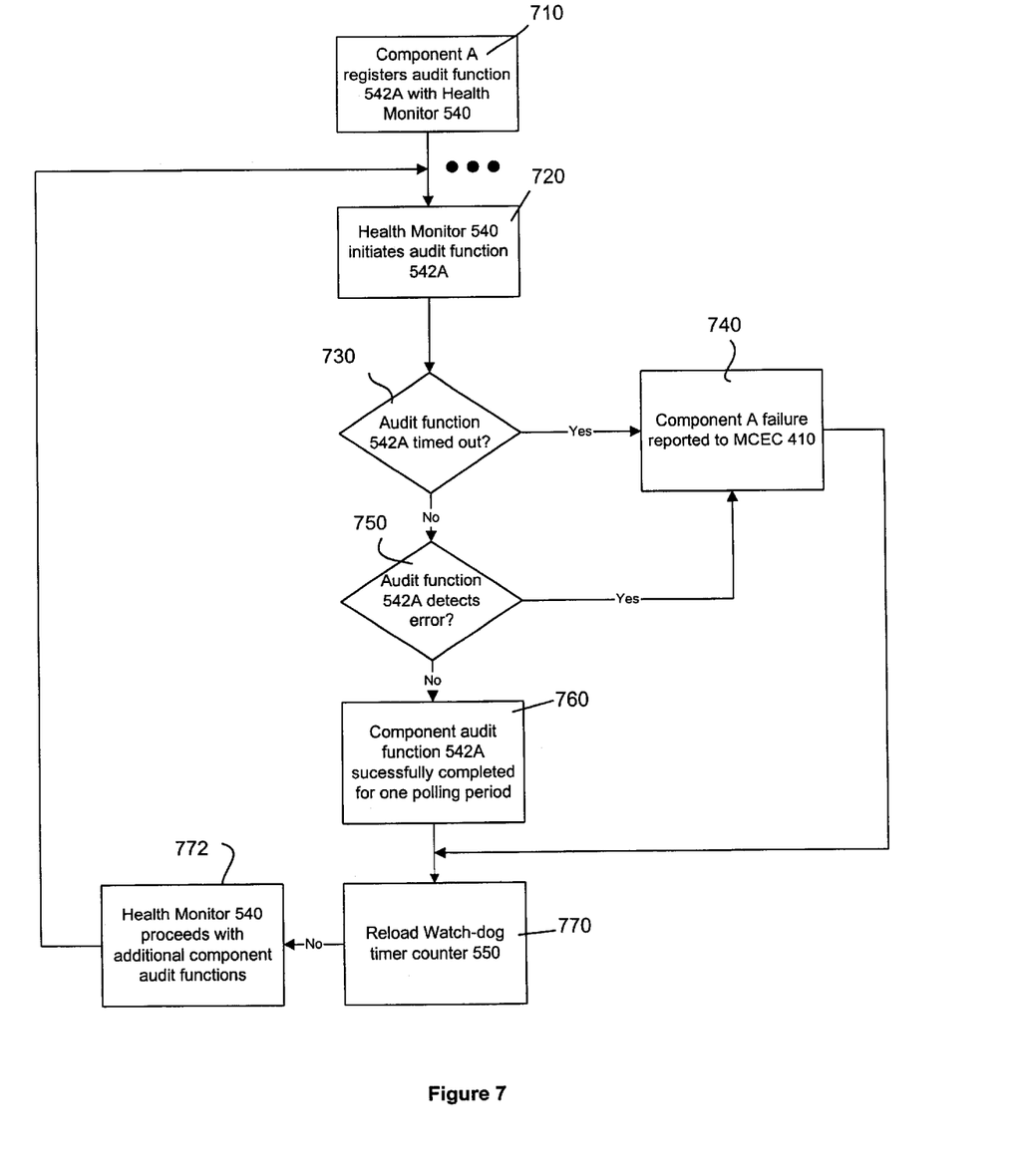
FIG. 7 is a flowchart of the functions of a health monitor module within an availability management system in accordance with an embodiment of the present invention.

FIG. 7 is a flowchart of the functions of the health monitor 540 within the availability management system 120 in an embodiment of the present invention. In step 710, component A registers its component audit function 542A with the health monitor 540. In step 720, the health monitor 540 initiates the audit function 542A within component A. In step 730, the health monitor 540 checks to see if the audit function 542A has failed to complete within the registered timeframe for audit 542A. If yes, a component A failure is reported to the MCEC 410 as a component status change (step 740). If no, the component A checks to see if any errors were detected in component A during the audit 542A (step 750). If yes, a component A failure is reported to the MCEC 410 (step 740). If no, the component audit function 542A is determined to have successfully completed for one polling period (step 760).

After a Component A failure is reported to the MCEC 410 (step 740), the health monitor 540 proceeds to step 770. Alternatively, the health monitor 540 proceeds to step 770 after step 760 is completed.

In step 770, the health monitor 540 reloads a counter on the watch-dog timer 550. As explained further in FIG. 8, this counter enables the watch-dog timer 550 to monitor the health monitor 540. If the health monitor 540 fails, it will not reload the counter and the watch-dog timer 550 will reboot the health monitor 540 node. In step 772, the health monitor 540 proceeds to implement additional registered component audit functions.

Figure 8:
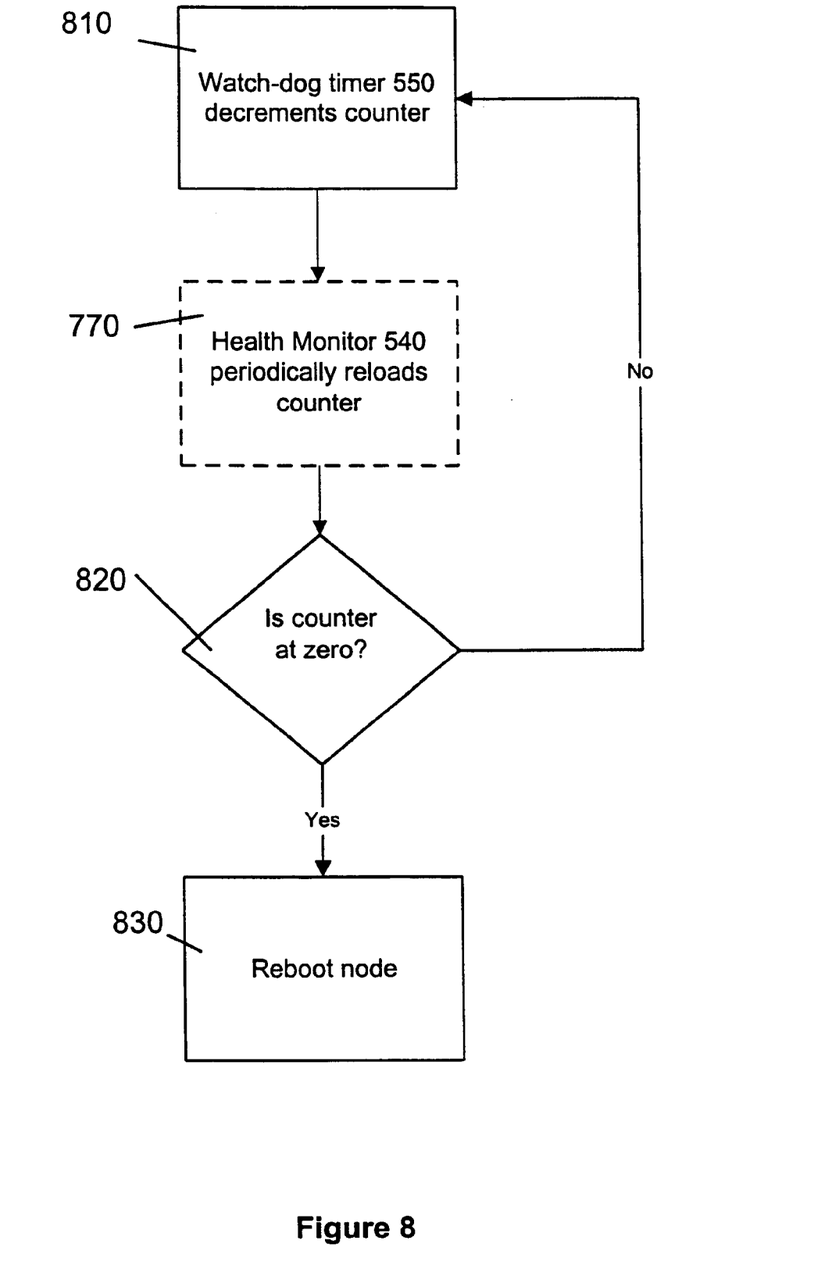
FIG. 8 is a flowchart of the functions of a watch-dog timer module within an availability management system in accordance with an embodiment of the present invention.

FIG. 8 is a flowchart of the functions of a watch-dog timer 550 within an availability management system 120 in accordance with an embodiment of the present invention. The watch-dog timer 550 contains a counter, which must be periodically reset in order to keep the watch-dog timer 550 from registering a failure of the component it is monitoring. Within the availability management system 120, the watch-dog timer 550 is monitoring the health monitor 540.

In step 810, the watch-dog timer 550 decrements its counter. Step 770 may occur, wherein the health monitor 540 periodically reloads the counter. However, step 770 will not occur if the health monitor 540 is not functioning properly. In step 820, the watch-dog timer 550 checks to see if the counter is at zero. If no, the watch-dog timer 550 repeats step 810. However, if the counter has reached zero, the watch-dog timer 550 reboots 830 the entire node containing the health monitor 540.

Referring back to FIG. 5, the availability manager 405, as discussed above, receives: component error reports from MCEC 410 and membership events from the cluster membership monitor 420. The availability manager 405 uses this information to adjust the status of components serviced by the availability manager 405 through output messages and information 580. For example, when a new component becomes ready for work, the availability manager 405 assigns the new component to a specific service and state (e.g. primary). When a component becomes unsuitable for work, the availability manager 405 instructs the component's stand-by to become primary, and takes the old component off-line. The availability manager 405 performs all of these reassignments automatically, without the need for operator intervention. All components serviced by the availability management system 120 register with the availability manager 405 in order to receive information allowing their availability status to be adjusted as necessary.

Figure 9:
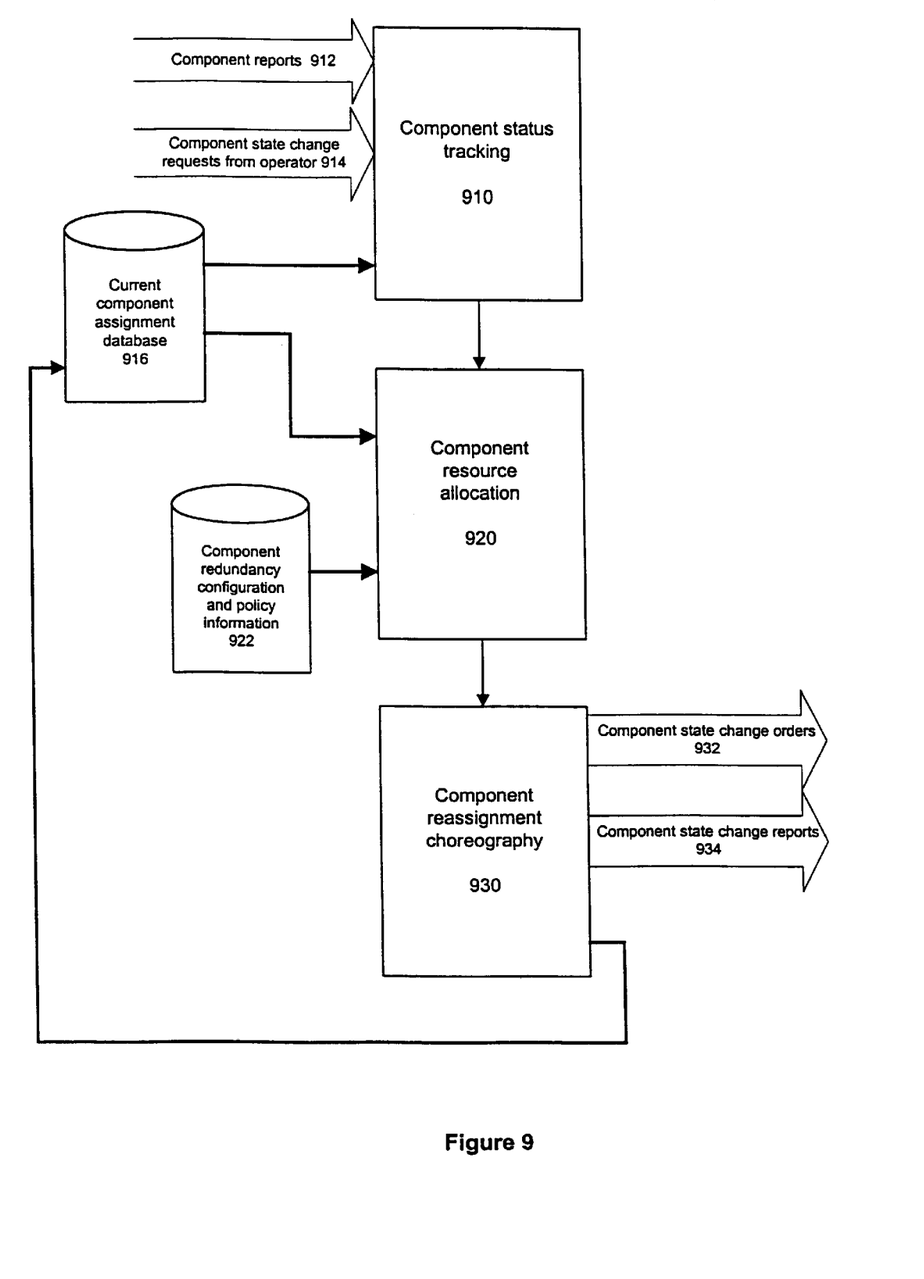
FIG. 9 is a flowchart of the method of operation for an availability manager module within an availability management system in accordance with an embodiment of the present invention.

The functions of the availability manager 405 are shown in more detail in FIG. 9. FIG. 9 is a flowchart of an embodiment of the operational method of the availability manager 405, including the main inputs and outputs of the logic of the availability manager 405. It will be understood by one of skill in the art that the embodiment shown in FIG. 9 is merely one illustrative implementation of a method for an availability manager 405. Many other implementations of an availability manager 405 are possible without departing from the inventive concepts disclosed herein.

As shown in FIG. 9, the availability manager 405 performs three main operations: component status tracking 910, component resource allocation 920, and component reassignment choreography 930. A current component assignment database 916 is involved in each of these operations, as an input to component status tracking 910 and component resource allocation 920, and as an output from component reassignment choreography 930. The current component assignment database 916 records, for each component, the component's state (e.g. serviceability, capacity), the component's currently assigned role (e.g. primary/secondary/spare/offline) and the component's desired role (e.g. primary/secondary/spare/offline).

Component status tracking step 910 receives component reports 912, component state change requests from the system operator 914, and the current component assignment database 916. Component reports include component error reports received from the MCEC 410 and membership event messages received from cluster membership monitor 420 (see FIG. 5). Component status tracking 910 updates the current state of each component in the component assignment database 916 based upon incoming component reports 912. Component status tracking 910 also updates the desired role of each component based upon incoming requests 914.

Component resource allocation step 920 implements the specific availability policy of the availability manager 405 by determining the proper state for each component. Component resource allocation 920 uses as input the current component assignment database 916 and component redundancy configuration and policy information database 922. Configuration and policy information 922 describes, for example, which components can act as backup for which other components. Configuration and policy information 922 also describes which components are required by the system and which components are optional, and the circumstances under which these policies apply. Configuration and policy information 922 further describes when it is acceptable to take a component out of service.

Component resource allocation 920 uses the configuration and policy information 922 to look for components whose state makes them unsuitable for service. Component resource allocation 920 looks at the current assignments for each component in the database, and changes a component's requested state if reassignment is appropriate. A wide range of methods may be used to implement the component resource allocation step 920. The availability manager 405 is a flexible and adaptable component suitable for implementing a variety of different availability policies and redundancy configurations.

Component reassignment choreography step 930 implements the desired component changes and notifies the overall system of the component changes. Reassignment choreography step 930 sends out component state change orders 932 to the affected components, and also sends out component state change reports 934 to notify other components within the system of the changes being made. The reassignment choreography step 930 also updates the current component assignment database 916.

Although the invention has been described in considerable detail with reference to certain embodiments, other embodiments are possible. As will be understood by those of skill in the art, the invention may be embodied in other specific forms without departing from the essential characteristics thereof. For example, the availability management system may be implemented in a non-clustered computer system architecture. Also, additional different component states may be implemented and managed by the availability management system. Accordingly, the present invention is intended to embrace all such alternatives, modifications and variations as fall within the spirit and scope of the appended claims and equivalents.

We claim:

1. In a high availability computer system including one or more nodes, each node including a plurality of components, wherein each component has an operational state, an availability management system for managing the operational states of the components, comprising:

a health monitor for performing a component status audit upon a component and reporting component status changes;

a timer for monitoring the health monitor and rebooting the node including the health monitor if the health monitor becomes non-responsive;

a multi-component error correlator for receiving the component status changes and applying pre-specified rules to determine whether a sequence of component status changes matches a known pattern, wherein the multi-component error correlator reports component status change pattern matches as component error reports; and an availability manager to receive the component error reports and assign operational states to the components in accordance with the received component error reports.

2. The availability management system of claim 1, further including:

a cluster membership monitor for monitoring node non-responsive errors and reporting node non-responsive errors, wherein the availability manager receives the component error reports and node non-responsive errors, and assigns operational states to the components in accordance with the received component error reports and node non-responsive errors.

3. The availability management system of claim 1, further including:

an in-line error detector signal for reporting component status changes.

4. The availability management system of claim 1, wherein the availability manager publishes component operational states to other nodes within the highly available computer system.

5. The availability management system of claim 1, wherein an operational state of a component is active.

6. The availability management system of claim 1, wherein an operational state of a component is standby.

7. The availability management system of claim 1, wherein an operational state of a component is spare.

8. The availability management system of claim 1, wherein an operational state of a component is off-line.

9. The availability management system of claim 1, wherein a component status change is a component failure.

10. The availability management system of claim 1, wherein a component status change is a component loss of capacity.

11. The availability management system of claim 1, wherein a component status change is a new component available.

12. The availability management system of claim 1, wherein a component status change is a request to take a component off-line.

13. The availability management system of claim 1, wherein the step of performing a component status audit further includes:
   initiating an audit upon a component;
   reporting a component error to the multi-component error correlator if the audit fails to complete within a specified time; and
   initiating a component error to the multi-component error correlator if the audit detects a component failure.

14. The availability management system of claim 1, further including:
   a first node including the availability manager; and
   a second node including a proxy availability manager, wherein the proxy availability manager relays messages to the availability manager.

15. The availability management system of claim 1, further including:
   a first node including the availability manager; and
   a second node including a back-up availability manager, wherein the back-up availability manager assumes the functions of the availability manager if the availability manager fails.

16. In a high availability computer system including one or more nodes, each node including a plurality of components, wherein each component has an operational state, a method for managing the operational states of the components, comprising:
   receiving a plurality of event reports;
   receiving a plurality of component status reports for at least one of the components from a health monitor residing on one of the nodes of the computer system;
   monitoring the health monitor;
   when the monitoring indicates the health monitor is non-responsive, rebooting the node including the health monitor;
   applying pre-specified rules to the plurality of event reports and plurality of component status reports, wherein the event reports and component status reports are compared to known event patterns, and wherein an event pattern match generates a component error report;
   receiving a plurality of component error reports; and
   dynamically readjusting the operational states of at least one of the components based upon the component error reports.

17. The method of claim 16, further including:
   receiving a plurality of node non-responsive reports; and
   dynamically readjusting the operational states of the components based upon the component error reports and the node non-responsive reports.

18. The method of claim 16, wherein an event report is received through a publish/subscribe event notification system.

19. The method of claim 16, wherein a component status report is generated by a component performing an internal self-audit.

20. In a high availability computer system including a plurality of components, wherein each component has an operational state, a method for managing the operational states of the components, comprising:
   registering the plurality of components with an availability manager;
   registering each of the plurality of component's associated states with an availability manager;
   accepting a plurality of reports regarding the status of components; and
   dynamically adjusting component state assignments based upon the reports, wherein the state assignments are selected from the group consisting of standby, spare, and off-line and wherein the reports indicate that a sequence of changes in the status of components matches a known pattern based on a set of pre-specified rules.

21. A computer program product for managing the operational states of the components in a high availability computer system including one or more nodes, each node including a plurality of components, wherein each component has an operational state, the computer program product comprising:
   program code configured to receive a plurality of event reports;
   program code configured to receive a plurality of component status reports;
   program code configured to apply pre-specified rules to the plurality of event reports and plurality of component status reports, wherein the event reports and component status reports are compared to known event patterns, and wherein an event pattern match generates a component error report;
   program code configured to receive a plurality of component error reports; and
   program code configured to dynamically readjust the operational states of the components based upon the component error reports, wherein the operational states are selected from the group of states consisting of standby, spare, and off-line.

22. The computer program product of claim 21, further including:
   program code configured to receive a plurality of node non-responsive reports; and
   program code configured to dynamically readjust the operational states of the components based upon the component error reports and the node non-responsive reports.

23. In a high availability computer system including one or more nodes, each node including a plurality of components, wherein each component has an operational state, an availability management system for managing the operational states of the components, comprising:
   a health monitor for performing a component status audit upon a component and reporting component status changes;

a multi-component error correlator for receiving the component status changes and applying pre-specified rules to determine whether a sequence of component status changes matches a known pattern, wherein the multi-component error correlator reports component status change pattern matches as component error reports; and an availability manager to receive the component error reports and assign operational states to the components in accordance with the received component error reports, wherein the operational states of a component are selected from the group consisting of standby, spare, and off-line.

24. The availability management system of claim 23, further including:

a cluster membership monitor for monitoring node non-responsive errors and reporting node non-responsive errors, wherein the availability manager receives the component error reports and node non-responsive errors, and assigns operational states to the components in accordance with the received component error reports and node non-responsive errors.

25. The availability management system of claim 23, further including:

an in-line error detector signal for reporting component status changes.

26. The availability management system of claim 23, wherein the availability manager publishes component operational states to other nodes within the highly available computer system.

27. The availability management system of claim 23, wherein the component status changes are selected from the group consisting of a component failure, a component loss of capacity, a new component available, and a request to take a component off-line.

28. The availability management system of claim 23, wherein the step of performing a component status audit further includes:

initiating an audit upon a component;

reporting a component error to the multi-component error correlator if the audit fails to complete within a specified time; and initiating a component error to the multi-component error correlator if the audit detects a component failure.

29. The availability management system of claim 23, further including:

a first node including the availability manager; and a second node including a proxy availability manager, wherein the proxy availability manager relays messages to the availability manager.

30. An availability management system for managing the operational states of the components in a high availability computer system including one or more nodes, each node including a plurality of components, the components each having an operational state, comprising:

a health monitor for performing a component status audit upon a component and reporting component status changes;

a multi-component error correlator for receiving the component status changes and applying pre-specified rules to determine whether a sequence of component status changes matches a known pattern, wherein the multi-component error correlator reports component status change pattern matches as component error reports and wherein the component status changes comprise a new component available or a request to take a component off-line; and an availability manager to receive the component error reports and assign operational states to the components in accordance with the received component error reports.

31. The availability management system of claim 30, further including:

a cluster membership monitor for monitoring node non-responsive errors and reporting node non-responsive errors, wherein the availability manager receives the component error reports and node non-responsive errors, and assigns operational states to the components in accordance with the received component error reports and node non-responsive errors.

32. The availability management system of claim 30, further including:

an in-line error detector signal for reporting component status changes.

33. The availability management system of claim 30, wherein the availability manager publishes component operational states to other nodes within the highly available computer system.

34. The availability management system of claim 30, wherein the step of performing a component status audit further includes:

initiating an audit upon a component;

reporting a component error to the multi-component error correlator if the audit fails to complete within a specified time; and initiating a component error to the multi-component error correlator if the audit detects a component failure.

35. The availability management system of claim 30, further including:

a first node including the availability manager; and a second node including a proxy availability manager, wherein the proxy availability manager relays messages to the availability manager.

36. An availability management system for managing the operational states of the components in a high availability computer system including one or more nodes, each node including a plurality of components, wherein each component has an operational state, comprising:

a health monitor for performing a component status audit upon a component and reporting component status changes;

a multi-component error correlator for receiving the component status changes and applying pre-specified rules to determine whether a sequence of component status changes matches a known pattern, wherein the multi-component error correlator reports component status change pattern matches as component error reports;

an availability manager to receive the component error reports and assign operational states to the components in accordance with the received component error reports;

a first node including the availability manager; and a second node including a back-up availability manager, wherein the back-up availability assumes the functions of the availability manager if the availability manager fails.

* * * * *